(12) United States Patent
Rothschild

(10) Patent No.: US 11,796,494 B2
(45) Date of Patent: Oct. 24, 2023

(54) COMPACT INSERTABLE X-RAY FLUORESCENCE DEVICE FOR PIPE INSPECTION

(71) Applicant: Viken Detection Corporation, Burlington, MA (US)

(72) Inventor: Peter J. Rothschild, Newton, MA (US)

(73) Assignee: Viken Detection Corporation, Burlington, MA (US)

( * ) Notice: Subject to any disclaimer, the term of this patent is extended or adjusted under 35 U.S.C. 154(b) by 0 days.

(21) Appl. No.: 17/804,475

(22) Filed: May 27, 2022

(65) Prior Publication Data

US 2022/0381711 A1    Dec. 1, 2022

Related U.S. Application Data

(60) Provisional application No. 63/193,940, filed on May 27, 2021.

(51) Int. Cl.
*G01N 23/223*    (2006.01)

(52) U.S. Cl.
CPC ... *G01N 23/223* (2013.01); *G01N 2223/0766* (2013.01); *G01N 2223/628* (2013.01)

(58) Field of Classification Search
CPC .......... G01N 23/223; G01N 2223/628; G01N 2223/0766
See application file for complete search history.

(56) References Cited

U.S. PATENT DOCUMENTS

| | | | |
|---|---|---|---|
| 3,862,418 A * | 1/1975 | Preiss | G01V 5/10 250/269.1 |
| 5,686,674 A | 11/1997 | Lowry et al. | |
| 6,097,785 A * | 8/2000 | Elam | G01N 23/223 250/269.1 |
| 7,839,969 B2 | 11/2010 | Gallup et al. | |
| 2010/0226476 A1 * | 9/2010 | Pesce | G01N 23/223 378/44 |

* cited by examiner

*Primary Examiner* — Jurie Yun
(74) *Attorney, Agent, or Firm* — Sunstein LLP

(57) ABSTRACT

Elemental composition of a pipe is determined by a fluorescence x-ray detector device. An outer housing of the device is inserted into the pipe via a flexible insertion member. A radioactive x-ray source is encompassed by a shield within the housing. A shutter selectively opens to enable radiation from the x-ray source to exit the shield and illuminate an inner wall of the pipe. An x-ray detector within the housing detects fluorescence x-rays emitted from the pipe upon illumination by the x-ray source. A controller then determines the presence of one or more elemental materials contained within the pipe based on the fluorescence x-rays.

10 Claims, 3 Drawing Sheets

COMPACT INSERTABLE X-RAY FLUORESCENCE DEVICE FOR PIPE INSPECTION

RELATED APPLICATION

This application claims the benefit of U.S. Provisional Application No. 63/193,940, filed on May 27, 2021. The entire teachings of the above application are incorporated herein by reference.

BACKGROUND

X-Ray Fluorescence (XRF) is a well-known technique that can be used to identify the elemental composition of materials. An x-ray source such as a radioactive isotope or an x-ray tube can be used to create x-rays that irradiate the sample to be inspected, and an energy-resolving detector can be used to detect the characteristic fluorescence x-rays emitted by the material upon excitation. For example, lead will emit L-shell x-rays with energies of 10.5 and 12.6 keV, and K-shell x-rays at energies of 75 and 85 keV. By detecting these specific x-ray fluorescence lines, the presence of lead can be determined, and the higher the intensity of the x-ray lines, the larger the concentration of lead that is present.

SUMMARY

Example embodiments include an apparatus for determining elemental composition of a pipe. An outer housing may be configured to be inserted into the pipe via a flexible insertion member. A radioactive x-ray source may be encompassed by a shield within the housing. A shutter may be coupled to the shield and configured to selectively open to enable radiation from the x-ray source to exit the shield and illuminate an inner wall of the pipe. An x-ray detector within the housing may be configured to detect fluorescence x-rays emitted from the pipe upon illumination by the x-ray source. A controller may be communicatively coupled to the x-ray detector and configured to determine the presence of one or more elemental materials contained within the pipe based on the fluorescence x-rays.

The diameter of the outer housing may be equal to or less than 0.75 inch, or, alternatively, equal to or less than 0.5 inch. The elemental materials determined by the controller may include lead. A steering device may be coupled to an end of the insertion member and configured to selectively adjust a position of the outer housing. The radioactive x-ray source may include Co-57 and/or Cd-109. The x-ray detector may include one or more of a silicon drift detector, a silicon photodiode, cadmium telluride, and cadmium zinc telluride. Further, the insertion member or outer housing may include markings at an outer surface indicating insertion depth of the outer housing within the pipe.

Further embodiments include a method of determining elemental composition of a pipe. An outer housing may be inserted into the pipe, the outer housing containing a radioactive x-ray source encompassed by a shield. A shutter coupled to the shield may be opened to enable radiation from the x-ray source to exit the shield and illuminate an inner wall of the pipe. Fluorescence x-rays emitted from the pipe may be detected upon illumination by the x-ray source via an x-ray detector. A presence of one or more elemental materials contained within the pipe may then be determined based on the fluorescence x-rays.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
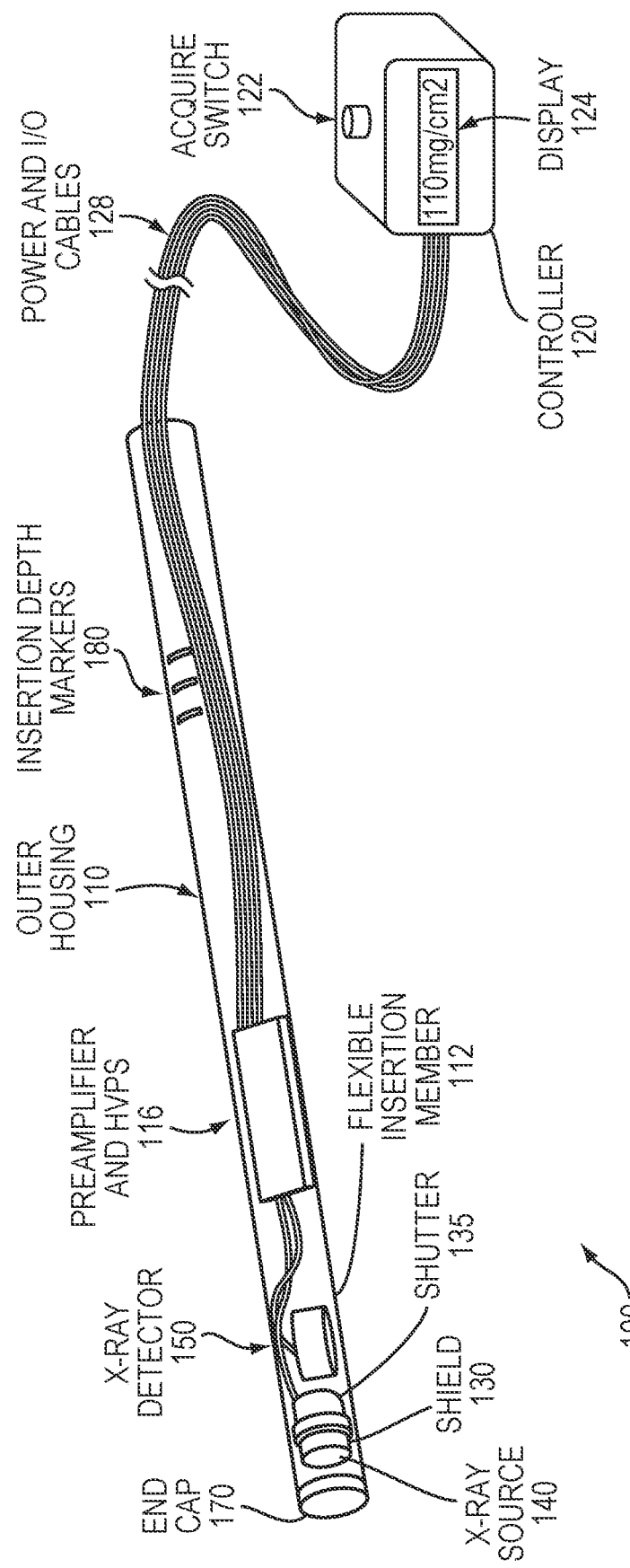
FIG. 1 is a schematic illustration of an apparatus for determining elemental composition of a pipe in one embodiment.

A description of example embodiments follows.

Recently, the issue of lead contamination of water supplies in the United Stated has become an important issue, especially following the widespread contamination of the water supply in Flint, Mich. In this instance, the water delivery infrastructure contained many sections of old lead service lines (LSLs), and changes in the chemicals being used to treat the water caused leaching of significant quantities of lead into the water supply, causing lead poisoning in many young and vulnerable children.

Recently, the United States Federal Government has approved many billions of dollars to start removing LSLs from the water supply. This process involves locating the presence of LSLs, many of which are buried at depths of 3-6 feet underground, and replacing them with non-toxic pipes such as plastic, copper, or galvanized steel.

Due to the depth at which they are buried, identifying and locating buried lead pipes presents a substantial challenge. One existing approach is to use vacuum excavation to gain access to the underground pipe for testing. Once access is obtained, it is relatively easy to determine by visual inspection whether the pipe is a lead pipe or some other material. However, this process is slow, expensive, and requires specialized equipment. Another method, which is often not practical due to the location of the water meter at a residence, is an inspection of the pipes that are directly connected to the meter. However, such connecting pipes are often made of a non-lead material, even though the buried or concealed service lines may contain lead.

X-Ray Fluorescence (XRF) is a well-known technique that can be used to identify the elemental composition of materials. An x-ray source such as a radioactive isotope or an x-ray tube can be used to create x-rays that irradiate the sample to be inspected, and an energy-resolving detector can be used to detect the characteristic fluorescence x-rays emitted by the material upon excitation. For example, lead will emit L-shell x-rays with energies of 10.5 and 12.6 keV, and K-shell x-rays at energies of 75 and 85 keV. By detecting these specific x-ray fluorescence lines, the presence of lead can be determined, and the higher the intensity of the x-ray lines, the larger the concentration of lead that is present.

As an example, there are existing lead analyzers that are designed specifically for lead paint inspection. One such device, the Viken Detection Pb200i, uses a Co-57 radioactive isotope to excite the lead atoms in the paint, and the device detects the K-Alpha x-rays at 75 keV. These x-rays have sufficient energy to penetrate any overlying paint that may not contain lead, thereby allowing the levels of even deeply buried lead to be accurately measured. In contrast, the L-shell x-rays with their much lower energies may not be able to penetrate the overlying paint, giving erroneous results.

Example embodiments described herein include a compact XRF analyzer device that can be inserted inside a pipe, allowing the materials making up the pipe walls to be identified. Such embodiments enable the presence of lead pipes to be detected, provided that the device can be inserted into, or close to, a buried or concealed section of lead pipe. Devices in example embodiments may contain a radioactive source due to its small size and extremely rugged structure. This configuration contrasts with x-ray sources that require a high-voltage generator in the instrument close to the x-ray source, and which is vulnerable to shock, adverse environmental conditions, and prone to failure. Alternative embodiments can contain an x-ray source such as a miniature x-ray tube in place of a radioactive source.

A particular embodiment device, which is also referred to herein as an apparatus for determining the elemental composition of a pipe, includes: a flexible outer housing that is insertable into a pipe under inspection; a radioactive source of x-rays contained within shielding material at one end of the housing; a shutter that can be remotely opened and closed such that unobstructed radiation can illuminate the inner wall of the pipe; an x-ray detector located within the housing that detects fluorescence x-rays emitted from the pipe wall upon illumination with the source; and a controller that indicates the presence of one or more elemental materials contained within the pipe wall.

FIG. 1 is a schematic illustration of a device 100 for determining elemental composition of a pipe in one embodiment. An outer housing 110 may be configured to be inserted into the pipe via a flexible insertion member 112. The outer housing 110 may be composed entirely of a flexible material such as vinyl, rubber, polyurethane or aluminum, and the flexible insertion member 112 may comprise an end portion of the housing 110 that is to be inserted first into the pipe. Alternatively, the outer housing 110 may have a rigid portion that is coupled to the flexible insertion member 112, wherein the outer housing 110 and flexible insertion member 112 may form a continuous tube housing the interior components of the device 100. In order to be insertable into a range of different pipes, the outer housing 110 and flexible insertion member 112 may have a small diameter, for example 0.75 inch, 0.5 inch, or less than 0.5 inch. Further, the insertion member 112 and/or outer housing 110 may include insertion depth markers 180 at an outer surface indicating insertion depth of the outer housing within the pipe.

The transport of the device 100 through a pipe can be achieved by mechanically pushing the flexible insertion member 112 into the pipe to be inspected, much as a device used to unclog sewer lines is pushed into the interior of the sewer. The flexible insertion member 112 can also be configured to be steerable by an operator. For example, a steerable cable may be installed in place of (or coupled to) an end cap 170 at the front end of the device 100. The steerable cable may also include a camera for providing the operator with a view of the pipe interior. An example of one such configuration is described below with reference to FIG. 2, and may allow the device 100 to be steered past obstructions or into side-branches of pipes that can be at oblique angles, as well as through right-angled connectors.

The outer housing 110 may house a radioactive x-ray source 140 that is encompassed by a shield 130. For example, the x-ray source 140 may include Co-57 and/or Cd-109, which emit radiation that is blocked from entering the surrounding environment by the shield 130. However, when the device 100 is inserted into a pipe to be inspected, a shutter 135 coupled to the shield 130 may selectively open to enable radiation from the x-ray source 140 to exit the shield 130 and illuminate an inner wall of the pipe. For example, the shutter 135 may be positioned within an opening in a wall of the shield 130. An x-ray detector 150 within the housing 110 may then detect fluorescence x-rays emitted from the pipe upon illumination by the x-ray source 140. The x-ray detector 150 may include, for example, a silicon drift detector, a silicon photodiode, a cadmium-telluride (CdTe) detector and/or a cadmium-zinc-telluride (CdZnTe) detector. The x-ray detector 150 may be cooled via a cooling mechanism (not shown) to provide higher energy resolution, allowing the detection limits of the lead or other materials to be lowered. An example x-ray detector 150 may be a small CdTe detector in a TO-8 can, which may have an active diameter of about 5 mm and contain a piezo-electric cooler contained within the can. Such a detector can be very compact, with an exterior diameter of about 15 mm, making it suitable for installation within an outer housing with a small diameter.

A controller 120 may be communicatively coupled to the x-ray detector 150 and the shutter 135 via power and I/O cables 128. The controller 120 may operate to control the opening and closing of the shutter 135 and process data from the x-ray detector 150 to determine the presence of one or more elemental materials contained within the pipe based on the fluorescence x-rays detected by the x-ray detector 150. A preamplifier and the high voltage power supply (HPVS) 116 may be connected between the controller 120 and the x-ray detector 150. The preamplifier and HPVS 116 may provide, for example, a ~600V biasing voltage for the detector, and may be positioned inside the housing 110 close to the x-ray detector 150 so that only low voltage and digital signals are transmitted back to the controller 120. The controller 120 may have a trigger or activation ("acquire") switch 122 to actuate the opening of the shutter 135 and activate the x-ray detector 150 to initiate the collection of data, thereby causing the x-ray source 140 to illuminate the interior wall of the pipe and cause the x-ray detector 150 to detect corresponding fluorescence x-rays emitted from the pipe. The controller 120 may also contain batteries or an external power interface for powering the device 100. A display 124 at the controller 120 can indicate a level of elemental material(s) (e.g., lead) detected by the x-ray detector 150, which can be recorded as a function of the insertion depth of the outer housing 110 into the pipe being inspected. This can optionally be achieved using an encoder which electronically tags the measured elemental levels as a function of the insertion depth of the outer housing into the pipe. The controller 120 may include a wireless interface (not shown) to communicate wirelessly with another computing device (e.g., laptop, smartphone, workstation) to transmit data indicating the level of elemental material(s) detected, and/or may receive and act upon commands from the computing device to operate the device 100 and acquire readings of the pipe.

Figure 2:
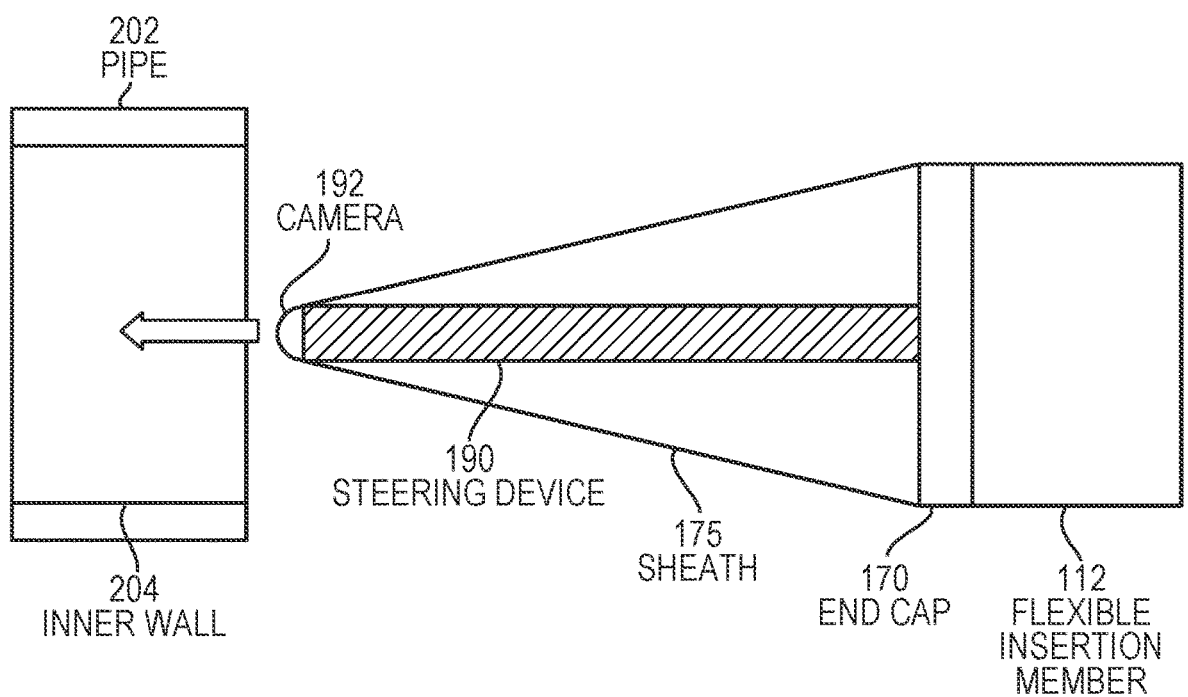
FIG. 2 is a diagram of a portion of the apparatus in a further embodiment.

FIG. 2 is a diagram of a portion of the device 100 shown with optional components. Here, a steering device 190 may be positioned at a front end of the flexible insertion member 112, coupled to or in place of the end cap 170, and may selectively adjust the position of the insertion member 112 and/or outer housing 110. The steering device 190 may be, for example, a steerable cable that optionally includes a camera 192 mounted to a terminal end of the cable for providing the operator with a view of an inner wall 204 of a pipe 202.

The controller 120 may be communicatively coupled to the steering device 190 and camera 192 via a cable, and the controller 120 may display a view captured by the camera 192 at the display 124 and include an interface for controlling the position of the steering device 190. Alternatively, another computing device in wireless communication with the controller 120 may provide such a display and interface. Thus, as the device 100 is moved farther into the pipe 202, an operator may view the interior of the pipe 202 as captured by the camera, and then the steering device 190 may be controlled to steer the device 100 past obstructions or into side-branches of pipes that can be at oblique angles, as well as through right-angled connectors. To facilitate this navigation, a rigid or flexible sheath 175 may surround some or all of the steering device (e.g., in a cone shape), thereby guiding the device 100 past obstructions that would otherwise collide with the end cap 170. In an alternative embodiment, the steering device 190 may be positioned inside the flexible insertion member 112, thereby causing the flexible insertion member 112 to bend in a direction controlled by the operator.

Figure 3:
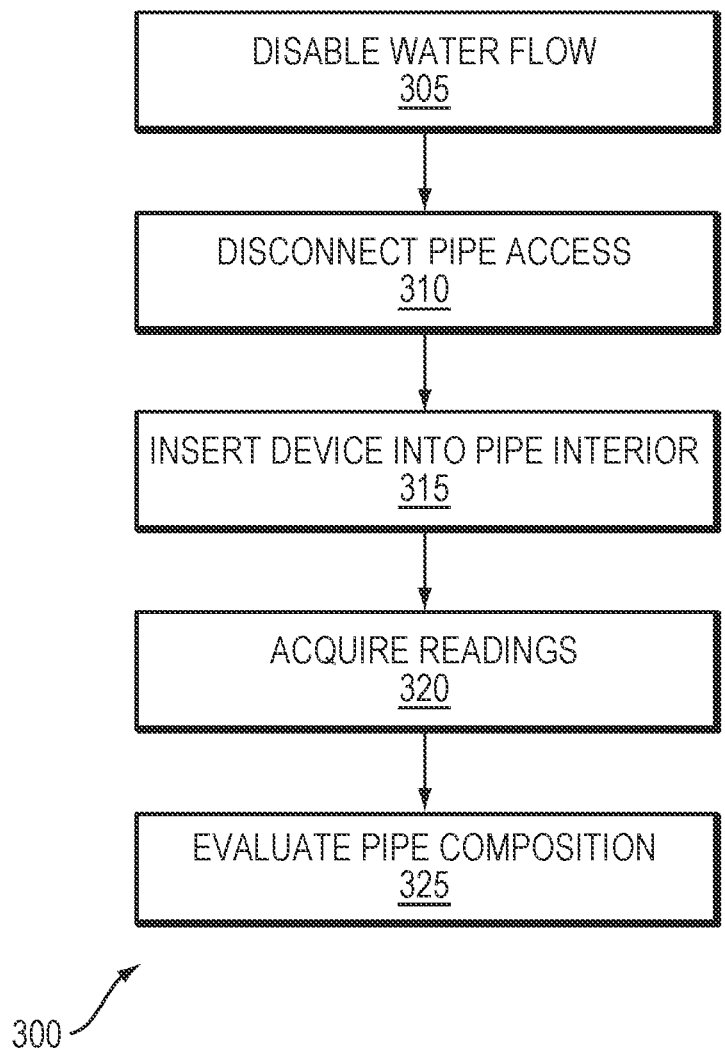
FIG. 3 is a flow diagram of a process of determining elemental composition of a pipe in one embodiment.

FIG. 3 is a flow diagram of a process 300 of determining elemental composition of a pipe in one embodiment. Remediation of an LSL to a dwelling may involve determining if any lead pipe is present in the pipe between the water shutoff at the curb-stop near the water main and the water meter located on an exterior wall of the dwelling, or within the basement of the dwelling. Currently, the presence of the lead pipe must be inferred from 1) records, which typically are not available or reliable due to the age of the LSL, 2) gaining access to the LSL by excavating around the LSL, which is time consuming and expensive, or 3) by noticing the presence of exposed lead pipes near the water meter. However, often the lead will not be visible even when present.

In contrast, example embodiments such as the device 100 may be employed in the process 300 described below to detect the presence of LSLs to a dwelling. With reference to FIGS. 1 and 2, first, water to the dwelling may be turned off at the curb-stop valve next to the water main (305). Access to the interior of the incoming pipe from the street may be disconnected at the water meter (310). The device 100 may then be inserted, led by the flexible insertion member 112, into the pipe interior (315). Once inserted to a desired depth, the device 100 may then be activated via the controller 120 to record lead readings, as described above, as a function of insertion depth within the pipe (320). Several readings can be acquired using the entire insertion length of the device 100, or until the end of the device 100 reaches the valve at the curb-stop. Finally, an examination of the lead-level profile along the length of the pipe, based on the readings captured by the controller 120, can then be used to assess the lead content of the pipe and the best remediation method (325).

While example embodiments have been particularly shown and described, it will be understood by those skilled in the art that various changes in form and details may be made therein without departing from the scope of the embodiments encompassed by the appended claims.

What is claimed is:

1. An apparatus for determining elemental composition of a pipe, comprising:
    an outer housing configured to be inserted into the pipe via a flexible insertion member;
    a radioactive x-ray source encompassed by a shield within the housing;
    a shutter coupled to the shield, the shutter configured to selectively open to enable radiation from the x-ray source to exit the shield and illuminate an inner wall of the pipe;
    an x-ray detector within the housing and configured to detect fluorescence x-rays emitted from the pipe upon illumination by the x-ray source; and
    a controller communicatively coupled to the x-ray detector, the controller configured to determine the presence of one or more elemental materials contained within the pipe based on the fluorescence x-rays.

2. An apparatus according to claim 1, wherein the diameter of the outer housing is equal to or less than 0.5 inch.

3. An apparatus according to claim 1, wherein the diameter of the outer housing is equal to or less than 0.75 inch.

4. An apparatus according to claim 1, wherein the one or more elemental materials includes lead.

5. An apparatus according to claim 1, further comprising a steering device coupled to an end of the insertion member and configured to selectively adjust a position of the outer housing.

6. An apparatus according to claim 1, wherein the radioactive x-ray source includes one of Co-57 or Cd-109.

7. An apparatus according to claim 1, wherein the x-ray detector includes at least one of a silicon drift detector, a silicon photodiode, cadmium telluride, and cadmium zinc telluride.

8. An apparatus according to claim 1, wherein the insertion member includes markings at an outer surface indicating insertion depth of the outer housing within the pipe.

9. An apparatus according to claim 1, wherein the insertion member includes an electronic encoder indicating insertion depth of the outer housing within the pipe.

10. A method of determining elemental composition of a pipe, comprising:
    inserting an outer housing into the pipe, the outer housing containing a radioactive x-ray source encompassed by a shield;
    opening a shutter coupled to the shield to enable radiation from the x-ray source to exit the shield and illuminate an inner wall of the pipe;
    detecting fluorescence x-rays emitted from the pipe upon illumination by the x-ray source via an x-ray detector; and
    determining a presence of one or more elemental materials contained within the pipe based on the fluorescence x-rays.

* * * * *